(12) United States Patent
Wang et al.

(10) Patent No.: US 11,692,322 B2
(45) Date of Patent: Jul. 4, 2023

(54) SPUR DIKE TYPE FISHWAY INLET

(71) Applicant: NANJING HYDRAULIC RESEARCH INSTITUTE, Nanjing (CN)

(72) Inventors: Xiaogang Wang, Nanjing (CN); Long Zhu, Nanjing (CN); Tao Wang, Nanjing (CN); Zhonghua Li, Nanjing (CN); Shilong Li, Nanjing (CN); Yongzeng Huang, Nanjing (CN); Kaixiao Chen, Nanjing (CN); Biao Wang, Nanjing (CN); Guoxiu Shang, Nanjing (CN); Zhe Wang, Nanjing (CN); Hongze Li, Nanjing (CN); Qiaoyi Hu, Nanjing (CN); Yifei Gao, Nanjing (CN); Feifei He, Nanjing (CN)

(73) Assignee: NANJING HYDRAULIC RESEARCH INSTITUTE, Nanjing (CN)

( * ) Notice: Subject to any disclaimer, the term of this patent is extended or adjusted under 35 U.S.C. 154(b) by 0 days.

(21) Appl. No.: 17/895,569

(22) Filed: Aug. 25, 2022

(65) Prior Publication Data
US 2023/0085258 A1 Mar. 16, 2023

(51) Int. Cl.
*E02B 8/08* (2006.01)
(52) U.S. Cl.
CPC ..................... *E02B 8/085* (2013.01)
(58) Field of Classification Search
CPC ............. E02B 8/085; E02B 8/08; E02B 1/006
USPC ...................................... 405/81, 82
See application file for complete search history.

(56) References Cited

U.S. PATENT DOCUMENTS

| 1,630,169 | A | * | 5/1927 | Coleman | ................. | E02B 8/085 |
| | | | | | | 405/82 |
| 2,826,897 | A | * | 3/1958 | Vinsonhaler | ............ | E02B 1/003 |
| | | | | | | 119/219 |
| 3,938,340 | A | | 2/1976 | Downs | | |

FOREIGN PATENT DOCUMENTS

| CN | 106192935 A | 12/2016 |
| CN | 106320293 A | 1/2017 |
| CN | 108221888 A | 6/2018 |
| CN | 108570973 A | 9/2018 |
| CN | 108708356 A | 10/2018 |
| CN | 110396999 A | 11/2019 |
| CN | 111254889 A | 6/2020 |

(Continued)

OTHER PUBLICATIONS

Chinese First Office Action, issued in Priority Application No. 202111065865.2, dated Jul. 4, 2022.

(Continued)

*Primary Examiner* — Sean D Andrish
(74) *Attorney, Agent, or Firm* — Birch, Stewart, Kolasch & Birch, LLP

(57) ABSTRACT

A spur dike type fishway inlet includes an upstream flow block wall, an extra water supply nozzle, and an artificial fish reef. The upstream flow block wall is arranged upstream of a fishway inlet; the starting end of the upstream flow block wall is connected with the upstream side wall of the fishway inlet through a connecting shaft and a hydraulic strut. The extra water supply nozzle is installed in the fishway inlet and is connected to the upstream of a power station through a pipeline to directly supply water to a high water head. The artificial reef is set up within the shielding range of the upstream flow block wall.

3 Claims, 3 Drawing Sheets

(56) References Cited

FOREIGN PATENT DOCUMENTS

CN            113718729 A     11/2021
GB              924746    *   5/1963

OTHER PUBLICATIONS

Chinese Notification to Grant Patent Right for Invention, issued in Priority Application No. 202111065865.2, dated Jul. 27, 2022.
Liang et al., "Layout design of fishway engineering of Shihutang avionics hub", Pearl River, Dec. 25, 2011, vol. 06, No. 2011, pp. 37-39.

* cited by examiner

SPUR DIKE TYPE FISHWAY INLET

FIELD OF THE INVENTION

The present invention belongs to the technical field of water conservancy engineering environmental protection, and particularly relates to the fishway inlet of a fishway, in particular to a spur dike type fishway inlet in a complex flow velocity environment.

BACKGROUND OF THE INVENTION

The construction of the sluice and dam interrupted the continuity of the river, and separated the upstream and downstream into two relatively independent ecological environments. The dam construction will impact fish lifecycle upstream and downstream ecology, and people's fishery production economy. Fish passages, fish lifts, etc. are widely used in global water systems as effective fish passage facilities, which mainly include fishway inlets, water supply facilities, pools, and fishway outlets.

Since the width of the fishway inlet is usually narrow, only about 2 m to 5 m, it is often referred to as the "eye of the needle project" compared to a river with a width of several hundred or even thousands of meters. How to make the inlet that can be quickly discovered by fish and can attract fish quickly to enter is a key problem that needs to be solved urgently in related industries. At present, the more mainstream solutions mainly include selecting the appropriate fishway inlet location and arranging the induction facilities. For the former, many international organizations and departments have issued relevant normative documents. For example, the United Nations Food and Agriculture Organization stipulate that the fishway inlet should avoid high turbulence areas and high velocity areas, and the fishway inlet should be arranged at the uppermost boundary of the fish migration. The fishway design guidelines of South Africa stipulate that the entrance should be placed near the shore because fish usually swim more on the shore than in the center of the river; for the latter, using flow to attract fish is the common methodology. In addition to the flash light, high-frequency sound waves, bubble screen, etc. are still in the experimental stage, and have seldom applications in some projects, and the comments on their effects are mixed.

Besides the above two methods, the method of redesigning the structure of the fishway inlet to improve the effect of attracting fish is relatively less studied in the industry. The evaluation of the fish passing effect of the established fish passages shows that the reason that the fish passing facilities have poor effects is that it is difficult for the fish to find the fish entrance during the migration, and the fish passage capability cannot be fully utilized. The technical defects are mainly manifested in:

1. In actual project, the existing layout principles are not comprehensive, and the layout of the fishway inlet is also affected by many factors such as the operation mode of the power station, the layout of the sluice gate, the operation mode, and the water depth of the river.

2. In the prior art with publication No. CN106192935A, a method and system for adjusting the river flow field at the fishway inlet are disclosed. By arranging a diversion wall on the upstream side of the fishway inlet, the flow field is divided into an outer flow field and an inner flow field, and a flow field suitable for migratory fish is generated in the inner flow field while preventing the outer flow field from interfering with the inner flow field. Use the diverter inlet high-velocity belt to block fish from crossing the fishway inlet. The disadvantage is that its facilities are relatively complex, and additional diverter walls need to be set up, which is difficult to construct and high in construction cost. Due to the complex and changeable flow field, the fixed diverter wall has a limited application range. In addition, it does not consider the end of the diverter wall and downstream turbulence. The kinetic energy is large, and it is easy to produce bad flow problems such as vortex and recirculation zone, which is not conducive to the upward tracing of fish.

3. In the prior art with publication No. CN111254889A, fishway inlet water supplements system, fish pass and water supplement method is disclosed. The fishway inlet extends out of the river bank obliquely, and extends into the tail water of the power station obliquely. The fishway inlet extending out of the river bank is used to deflect the tail water of the power station, so as to realize the shielding effect of the fishway inlet, and then in the fishway inlet. A suitable migratory zone is created in the downstream of the plant, and the tail water of the power station is used to replenish water at the fishway inlet. The disadvantage is that the application environment is the tail water area of the power station. In fact, many mountain river areas have high flow velocity, and fish cannot go up to the tail water area of the power station. Therefore, the inlet will be arranged in the downstream area, and the water flow in this area is complex and its water supply is complicated. The design cannot meet the requirements of attracting fish. In addition, although the fishway inlet can serve as a cover, it cannot cope with changing water flow conditions because the wall is fixed, especially when the fishway inlet is arranged in the downstream area. Considering the large turbulent kinetic energy at the end of the diverter wall and the downstream, it is easy to generate eddies and unfavorable flow conditions such as recirculation zones, which is not conducive to the upward tracing of fish.

SUMMARY OF THE INVENTION

The purpose of the present invention is to provide a spur dike type fishway inlet that can be flexibly applied to a changeable water flow environment. The spur dike type fishway inlet of the present invention can be adapted to complex water flow conditions, and the efficiency of passing fish through the fishway is improved.

The spur dike type fishway inlet of the present invention includes the following contents: upstream flow block wall, extra water supply nozzle and artificial reef.

The above-mentioned upstream flow block wall is arranged upstream of a fishway inlet. The starting end of the upstream flow block wall is connected with the upstream side wall of the fishway inlet through a connecting shaft and a hydraulic strut. The extra water supply nozzle is installed in the fishway inlet and is connected to the upstream of a power station through a pipeline to directly supply water to a high water head. The artificial reef is set up within the sheltered area of the upstream flow block wall.

The above-mentioned upstream flow block wall is a floating bulkhead gate, which comprises: a floating bulkhead body, a set of filling and draining devices, and a set of fish attracting devices.

The filling and draining device is installed in the floating bulkhead body, one end of the floating bulkhead body is installed with the connecting shaft, and the floating bulkhead body can float up along the connecting shaft. The bottom of the other end of the floating bulkhead body is installed with a fixing foot. When the bulkhead body is set in the right position, the fixing foot can help the bulkhead body stability.

The fish attracting devices comprises: two reels and a ring grid. The ring grid is sleeved on the reels. Both ends of the said two reels are rotatable fixed on the downstream surface of the floating bulkhead body respectively.

The ring grid is a vertical striped plastic mesh, and the stripe color is black and white.

The upper end of the reels on the side of the connecting shaft is equipped with a motor, which pushes the reels to rotate. When the reel rotates, it drives the ring grid to rotate at the same time. When the nearby fish see the ring grid rotating, their mechanism of the keeping target stability in the flow will play a role, and it will move follow the movement direction of the ring grid.

A vortex elimination grid is also installed at the end of the floating bulkhead body.

The outlet of the extra water supply nozzle faces the fishway inlet. The pipeline is provided with a control valve to control the incoming flow.

The artificial reef is arranged near the fishway inlet and downstream of the flow block wall, which is conducive to the formation of near-natural water flow to attract fish into the fishway, and for fish to rest.

The beneficial effects of the present invention are:

1. The present invention provides a device for attracting fish by adopting the fish target keeping behavior.
2. The angle of the upstream flow block wall can be freely adjusted and is easy to adjust under the buoyancy and the mechanical force.
3. By arranging an extra water supply device and the fish reef, the capacity to attract fish of inlet is enhanced, and the fish passing effect is improved.

DESCRIPTION OF THE DRAWINGS

The following drawings are only for the purpose of description and explanation but not for limitation.

DESCRIPTION OF PREFERRED EMBODIMENT

The present invention will be further described below with reference to specific embodiments, but the protection scope of the present invention is not limited thereto.

Example 1

Figure 1:
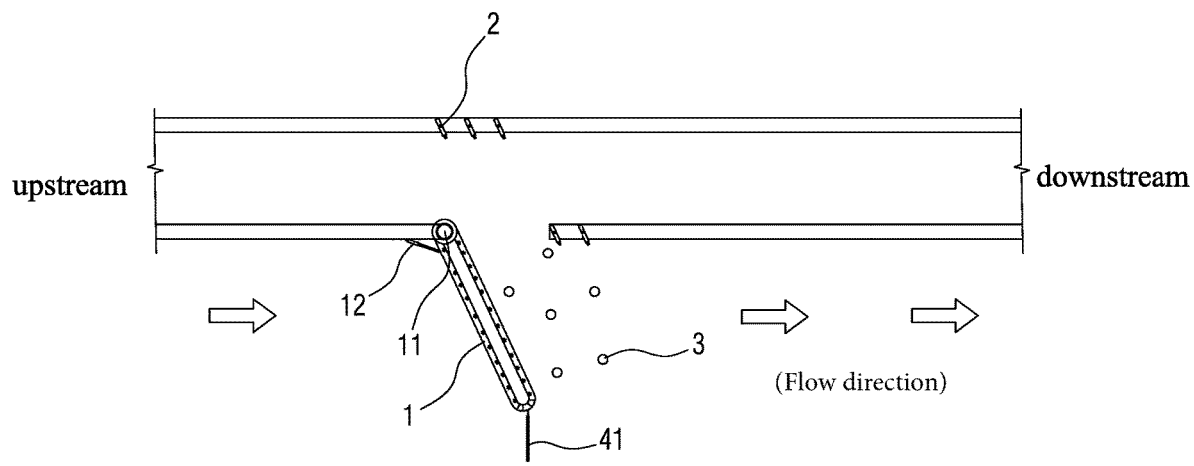
FIG. 1 is the overall schematic diagram that the present invention is installed at the fishway inlet.

Referring to FIG. 1 showing a spur dike type fishway inlet, which includes the following contents: an upstream flow block wall 1, an extra water supply nozzle 2, and an artificial reef 3.

Spur dike is widely used in riverbank protection from erosion. It produces a field of nearly still water directly downstream of itself. The spur dike type fishway inlet of the present invention is used upstream of the fishway inlet to cover the entry.

The above-mentioned upstream flow block wall 1 is arranged upstream of a fishway inlet. The starting end of the upstream flow block wall 1 is connected with the upstream side wall of the fishway inlet through a connecting shaft 11 and a hydraulic strut 12. The hydraulic strut 12 is supported between the upstream flow block wall 1 and the upstream side wall. The extra water supply nozzle 2 is installed in the fishway inlet and is connected to the upstream of a power station through a pipeline to directly supply water to a high water head. The artificial fish reef 3 is set up with the shielded area of the upstream flow block wall 1.

The above-mentioned upstream flow block wall 1 is a floating bulkhead gate, which comprises: a floating bulkhead body, a set of filling and draining devices, and a set of fish attracting devices.

Figure 3:
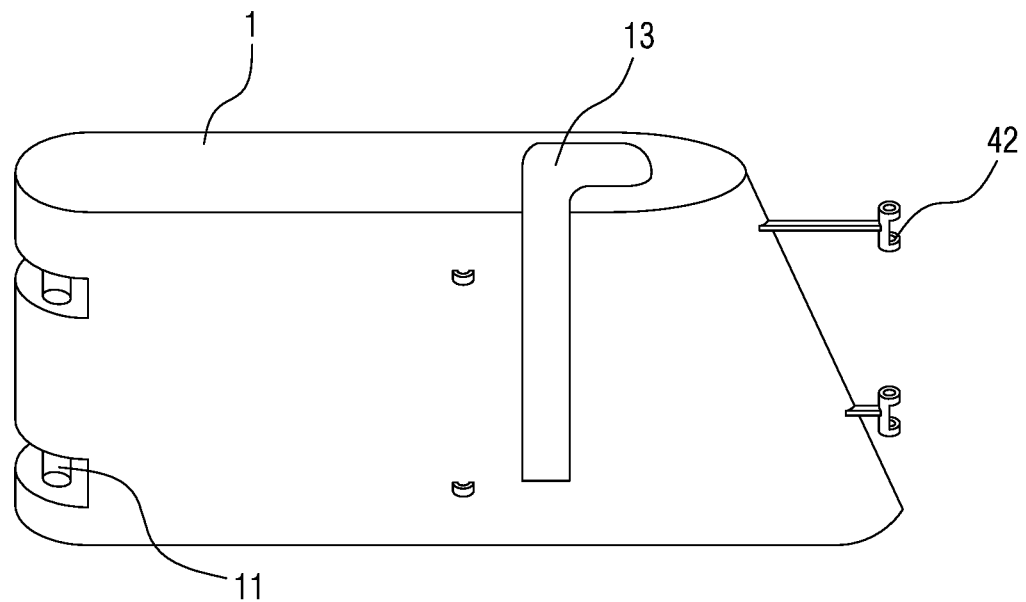
FIG. 3 is an overall schematic diagram of the upstream flow block wall of the present invention.
Figure 5:
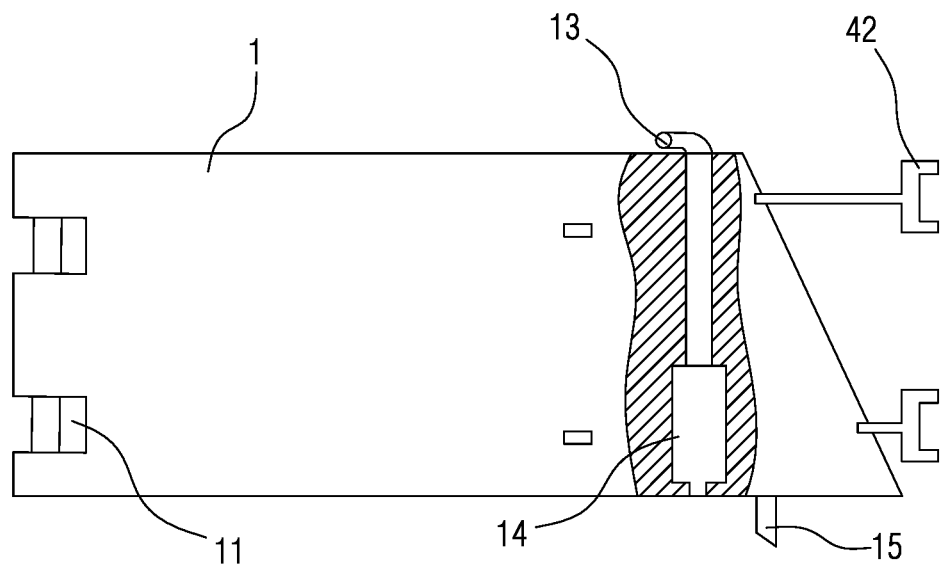
FIG. 5 is a schematic cross-sectional view of the longitudinal centerline of the upstream flow block wall of the present invention.

As shown in FIG. 3 and FIG. 5, the filling and draining devices includes: a filling and draining pipe 13 and a filling and draining pump 14. The filling and draining pipe 13 and the filling and draining pump 14 are installed in the floating bulkhead body. One end of the floating bulkhead body is installed with the connecting shaft 11, and the bottom of the other end is installed with a fixing foot 15.

Figure 2:
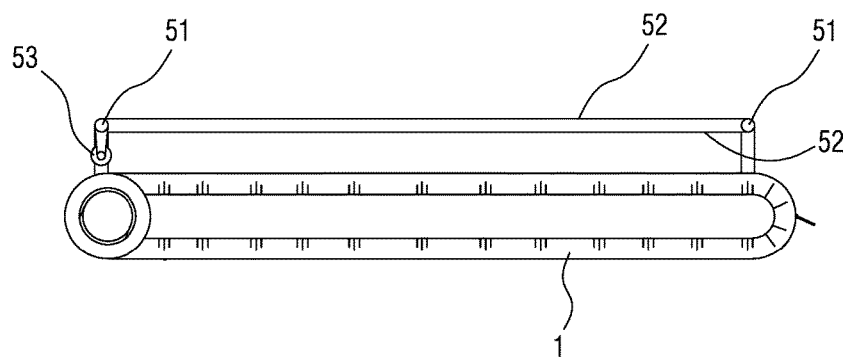
FIG. 2 is a schematic top view of the upstream flow block wall of the present invention.
Figure 4:
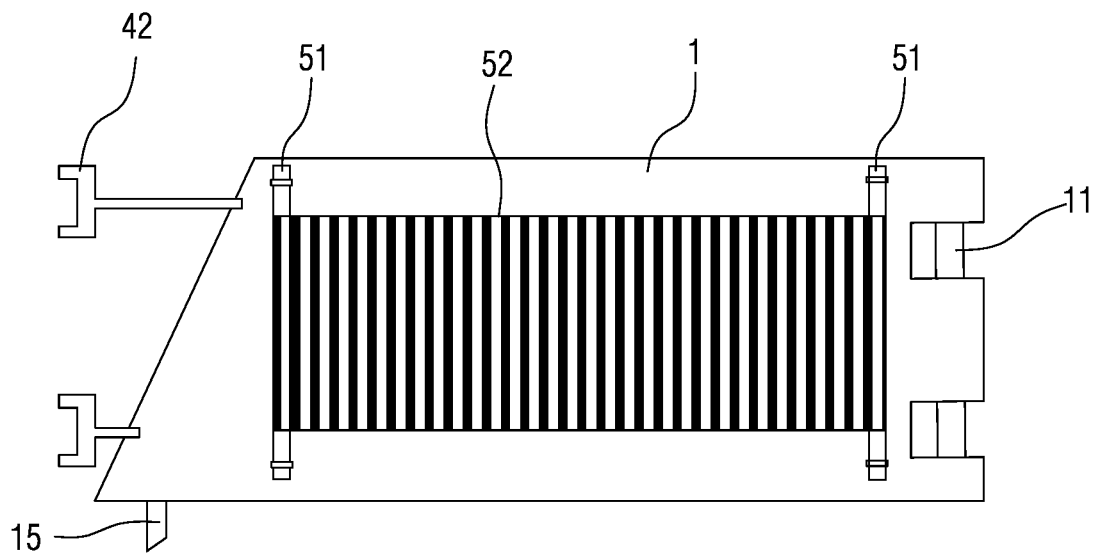
FIG. 4 is a schematic view of the upstream flow block wall of the present invention viewed from the downstream direction.

As shown in FIGS. 2 and 4, the above-mentioned fish attracting devices include: two reels 51 and a ring grid 52. The ring grid 52 is sleeved on the reels 51, and both ends of the said two reels 51 are rotatable fixed on the downstream surface of the floating bulkhead body respectively.

The ring grid 52 is a vertical striped plastic mesh, and the stripe color is black and white.

A motor 53 is installed on the upper end of the reel 51 on the side of the connecting shaft 11, which pushes the reels 51 to rotate. When the reel 51 rotates, it drives the ring grid 52 to rotate at the same time. When the nearby fish see the ring grid 52 rotating, their mechanism of the keeping target stability in the flow will play a role, and it will move follow the movement direction of the ring grid 52.

The outlet of the extra water supply nozzle 2 faces the fishway inlet, and the pipeline is provided with a control valve to control the flow.

The artificial reef 3 is arranged near the fishway inlet and downstream of the flow block wall, which is conducive to the formation of near-natural water flow to attract fish into the fishway, and for fish to rest.

Example 2

Except for the following contents, the other parts in this embodiment are the same as in Embodiment 1.

In this embodiment, the elevation of the bottom of the orifice of the filling and draining pipe 13 is located at the historical lowest water level downstream of the hub.

Example 3

Except for the following contents, the other parts in this embodiment are the same as in Embodiment 1.

Figure 6:
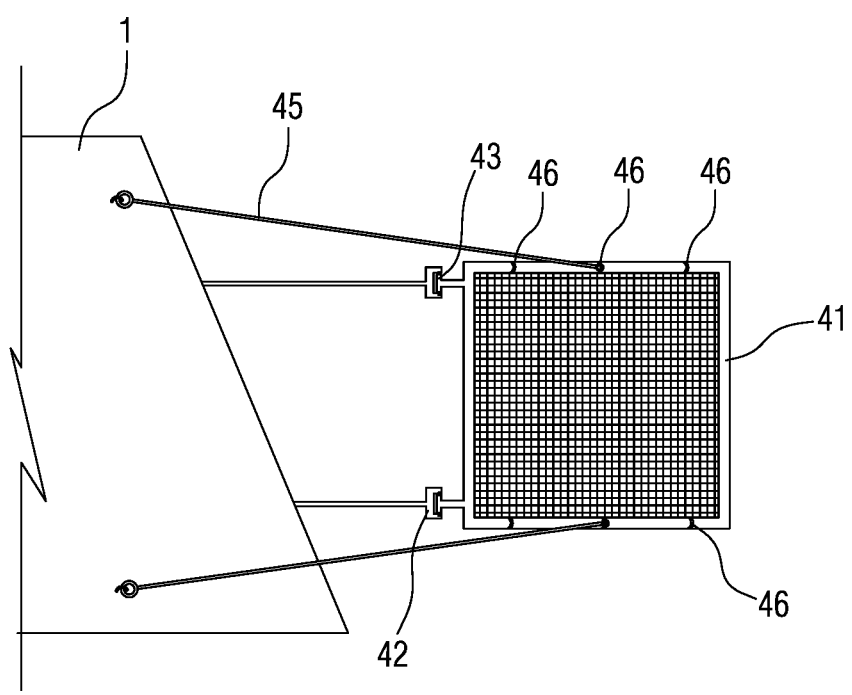
FIG. 6 is a schematic diagram of the installation of a vortex elimination grille of a spur dike type fishway inlet according to the present invention.

In the present embodiment, as shown in FIG. 6, a vortex elimination grille 41 is also installed at the end of the floating bulkhead body, and the vortex elimination grille 41 is connected to the floating bulkhead body through a hinge 42. The size of the vortex elimination grille 41 is: the height is 1.2 m, the width is 1.4 m, and the fixed top elevation is the average water level in the downstream flood season of 1.2 m. The grid holes of the vortex elimination grille 41 are square, the side length is 2 cm-5 cm, and the thickness of the grid holes is 2 cm-3.2 cm. Because the local flow direction was changed by the spur dike and the vortexes are produced at the end of the dike, which attracts fish to stop over and puzzle in the vortexes. The vortex elimination grille can be used to eliminate the vortex and reduce the fish residence time.

The above-mentioned vortex elimination grille 41 is a stainless steel grid mesh. The hinge shaft 43 is riveted to the vortex elimination grille 41, and the riveting place is reinforced. At the downstream end of the upstream flow block wall 11 of the spur dike type fishway inlet, a shackle 46 is riveted on the vortex elimination grid 42, and the support rod 45 is hooked on the shackle 46 with a ring hook.

The other end of the above-mentioned support rod 45 is hooked on the ring hook at the downstream end of the upstream flow block wall 1 of the spur dike type fishway inlet.

The invention claimed is:
1. A spur dike type fishway inlet comprising:
an upstream flow block wall;
an extra water supply nozzle; and
an artificial reef,
wherein the upstream flow block wall is arranged upstream of the fishway inlet,
wherein a starting end of the upstream flow block wall is connected with an upstream side wall of the fishway inlet through a connecting shaft and a hydraulic strut,
wherein the extra water supply nozzle is installed in the fishway inlet,
wherein the artificial reef is set up within a sheltered area of the upstream flow block wall,
wherein the upstream flow block wall is a floating bulkhead gate, the floating bulkhead gate comprising:
a floating bulkhead body;
a set of filling and draining devices; and
a set of fish attracting devices,
wherein the filling and draining devices are installed in the floating bulkhead body,
wherein the connecting shaft is coupled to one end of the floating bulkhead body, and a fixing foot is coupled to a bottom of an other end of the floating bulkhead body,
wherein an outlet of the extra water supply nozzle faces the fishway inlet, and
wherein the artificial reef is arranged near the fishway inlet and downstream of the flow block wall, which is conducive to a formation of near-natural water flow to attract fish into the fishway inlet, and for fish to rest.

2. The spur dike type fishway inlet according to claim 1, wherein the fish attracting devices comprises:
two reels and a ring grid,
wherein the ring grid is sleeved on the reels,
wherein both ends of the said two reels are rotatable fixed on a downstream surface of the floating bulkhead body respectively,
wherein the ring grid is a vertical striped plastic mesh, and stripe colors are black and white,
wherein an upper end of the reels on a side of the connecting shaft is equipped with a motor, which pushes the reels to rotate,
wherein when the reels rotate, the reels drive the ring grid to rotate at the same time.

3. The spur dike type fishway inlet according to claim 1, wherein the floating bulkhead body is further provided with a vortex elimination grille.

* * * * *